July 10, 1923.
D. L. LAZERICK
PUNCTUREPROOF RELINER FOR PNEUMATIC TIRES AND CASINGS
Filed Jan. 30, 1922
1,461,217
2 Sheets-Sheet 1
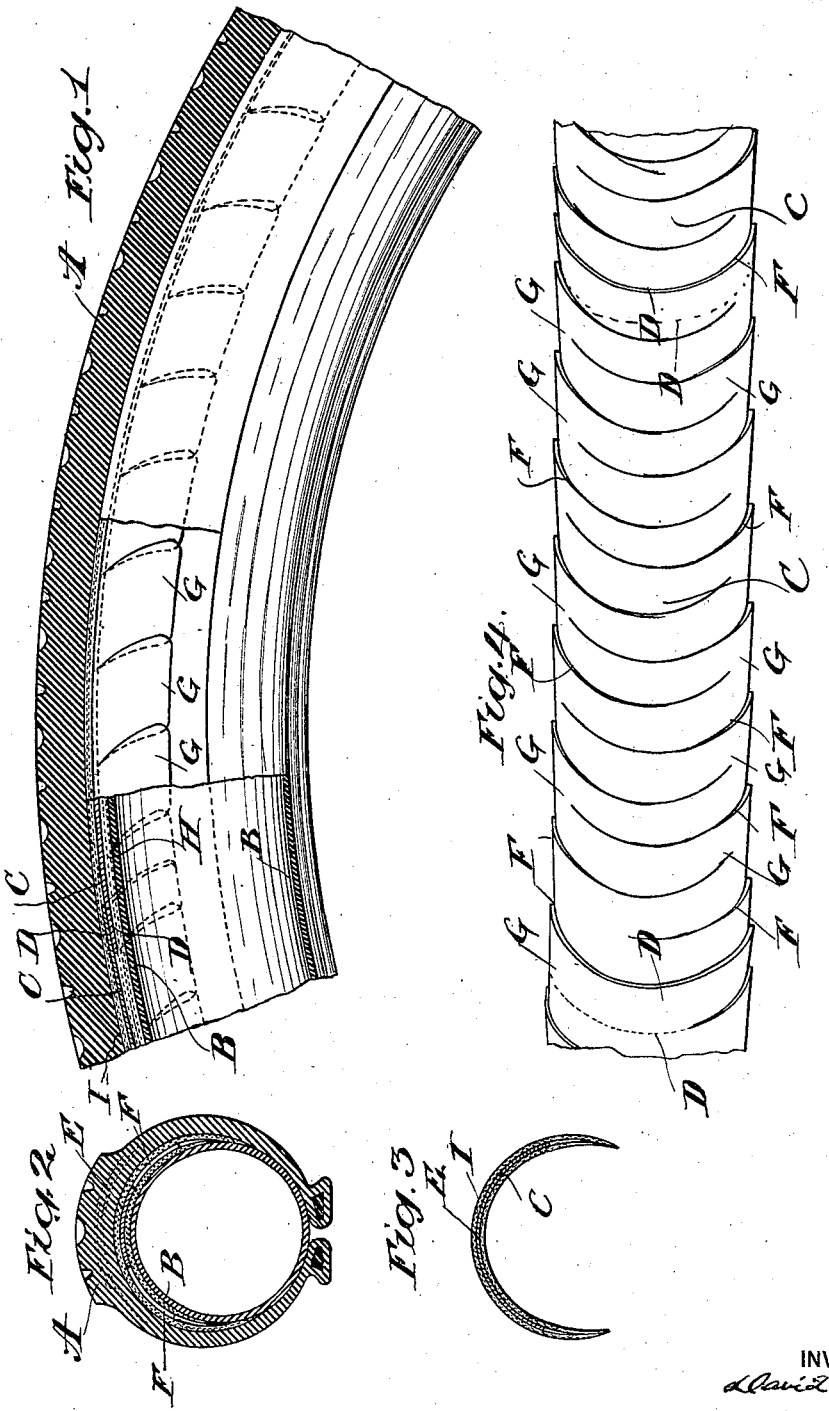
INVENTOR
David L. Lazerick
BY
ATTORNEY

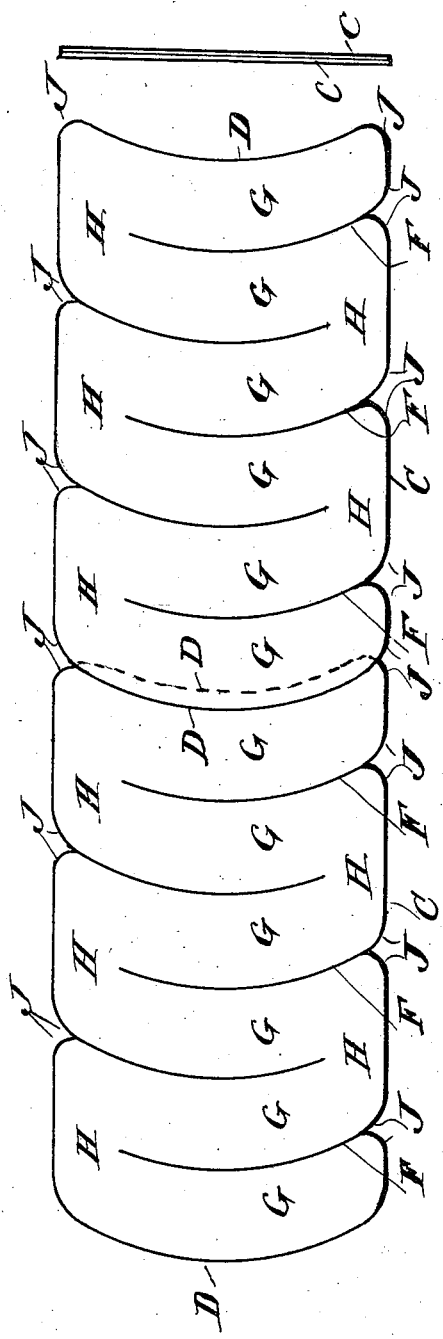

Patented July 10, 1923.

1,461,217

UNITED STATES PATENT OFFICE.

DAVID L. LAZERICK, OF CLEVELAND, OHIO.

PUNCTUREPROOF RELINER FOR PNEUMATIC TIRES AND CASINGS.

Application filed January 30, 1922. Serial No. 532,594.

*To all whom it may concern:*

Be it known that I, DAVID L. LAZERICK, a citizen of the United States, and resident of Cleveland, in the county of Cuyahoga and State of Ohio, have invented certain new and useful Improvements in Punctureproof Reliners for Pneumatic Tires and Casings, of which I hereby declare the following to be a full, clear, and exact description, such as will enable others skilled in the art to which it appertains to make and use the same.

The objects of the invention are to provide a simple and efficient and flexible sheet metal shield for a pneumatic tire or tube which will yield in all directions to adapt itself to the contours of the tire and is also capable of expansion and contraction to accommodate itself to the movements of the tire when inflated and expanded, and when deflated and compressed.

To accomplish these objects the shield comprises a thin band of spring metal preferably steel which has been electroplated with copper to enable it to unite with a rubber coating when vulcanized.

To enable the sheet metal shield to bend to conform to the circumferential curvatures of the tire, a band is formed wide enough when curved laterally to protect the tread side of the tire and to extend over the sides for enough to prevent a puncture thereof.

The invention further comprises an annular metal band curved to conform to the long and short curvature of the tire and inner tube and slitted in the form of circular arcs upon its circumferential margins alternate slits being cut from opposite edges of the shield, the said arcs being parallel and alternately extending to the margins, no central band of integral metal remaining, thus giving unusual flexibility to the band when bent in any direction and permitting it to expand when the tire becomes flattened.

The edges of these slits when the band is curved will overlap and permit any amount of bending desired, so that it will yield to pressure from any direction.

The curved slits upon one side are staggered in relation to the slits upon the other side and the slits ovelap at their extremities leaving only a small connecting integral part.

The curvature of the slits is directed forward upon the lower or ground side of the band and tire, the effect of which is to make the tongues or vanes separated by the slits more flexible and adapted to be depressed one at a time on opposite sides of the band and to have their extremities trail to the rear as the tire advances over the ground in the manner of a feather drawn over a flat surface and the curved edges of the tongues or vanes are presented to the rear and will not cut the tire or inner tube.

The invention comprises the combination and arrangement of parts hereinafter described, shown in the accompanying drawings and specifically pointed out in the claims.

In the accompanying drawings, Fig. 1, is a longitudinal section of a tire or casing showing the inner tube and the shield and its envelope. Fig. 2, is a transverse section thereof; Fig. 3, is a transverse section of the shield and its envelope. Fig. 4, is a plan of a portion of the shield showing it formed in overlapping sections. Fig. 5 is a plan of the shield before it has been introduced into the tire, and has been curved to conform therewith and illustrates the arcuate shape of the transverse slits. Fig. 6, is an edge view.

In these views, A, is the casing. B, is the inner tube; C, C, are the sections of the shield which overlap each other at D, D, at their extremities; E, is the integral median portion of the shield, which may be perfectly smooth as shown in Fig. 4, or waved as shown in Fig. 5, which permits of elongation and contraction under the movements of the tire and inner tube; F, F, are parallel arcuate slits which alternately pass through the edges of the shield and curve on each side of the shield towards the rear on the ground side of the tire so that as the wheel advances extremities of the tongues or vanes G, G, separated from each other by the curved slits will trail towards the rear and will be depressed in succession and will not be projected in such a manner as to cut into or lacerate the envelope H, in which the band is enclosed.

These extremities are also preferably rounded at J, and as the band is curved laterally and longitudinally the extremities and sides of the tongues will overlap those in the rear edges of the vanes and prevent them from cutting the inner tube.

The curved slits upon one lateral side of the band are staggered in relation to the curved slits in the opposite lateral side and overlap the same leaving only a narrow margin H, thus making the edges more flexible since they are depressed one at a time upon alternate sides of the band and hence are more easily depressed. The overlapping slits also permit flexing and slightly elongating the band without separating the overlapping edges of the tongues.

The whole shield is finally coated with rubber and vulcanized in a fabric envelope with overlapping ends, which permits it to be introduced loosely between the tire and tube or vulcanized integrally into the tire or casing.

Having described the invention what I claim as new and desire to secure by Letters Patent is:

A shield for a pneumatic tire or tube comprising a band of thin sheet metal curved to conform to the circumferential curves of said tube and tire, said band provided with parallel arcuate marginal slits, alternate slits being cut from opposite edges of said shield, said slits overlapping each other beyond the axial center of the band at their outer ends, the tongues separated by said slits having their adjoining edges overlapping and the rear edge of each tongue overlapping the forward edge of the next adjoining tongue, the extremities of said slits extending rearwardly upon the road side of said tire.

In testimony whereof, I hereunto set my hand this 10th day of January, 1922.

DAVID L. LAZERICK.

In presence of—
WM. M. MONROE,
CHAS. F. SIPE.